Figures 1, 2, 3, 4, 5:
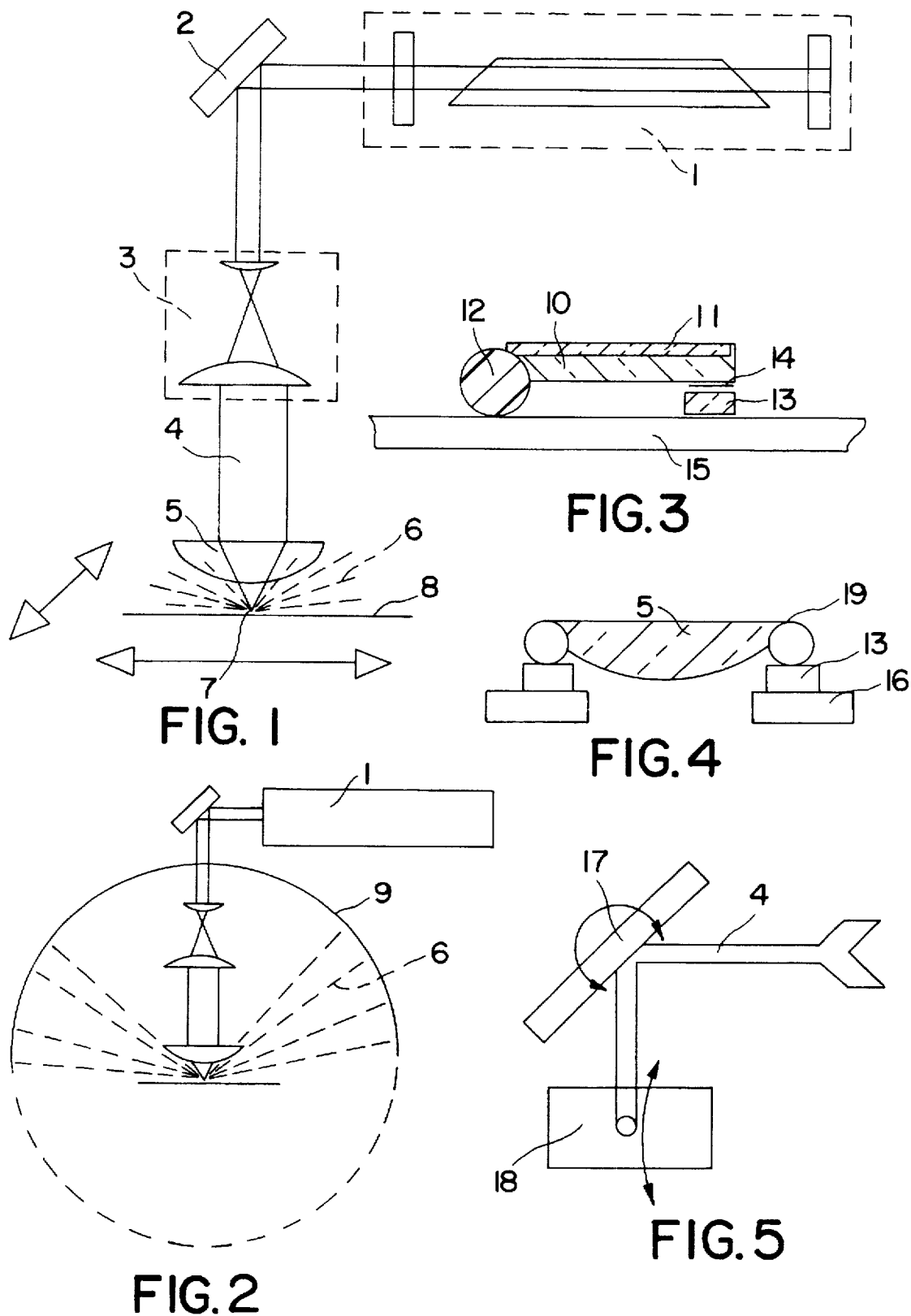
Figure 6:
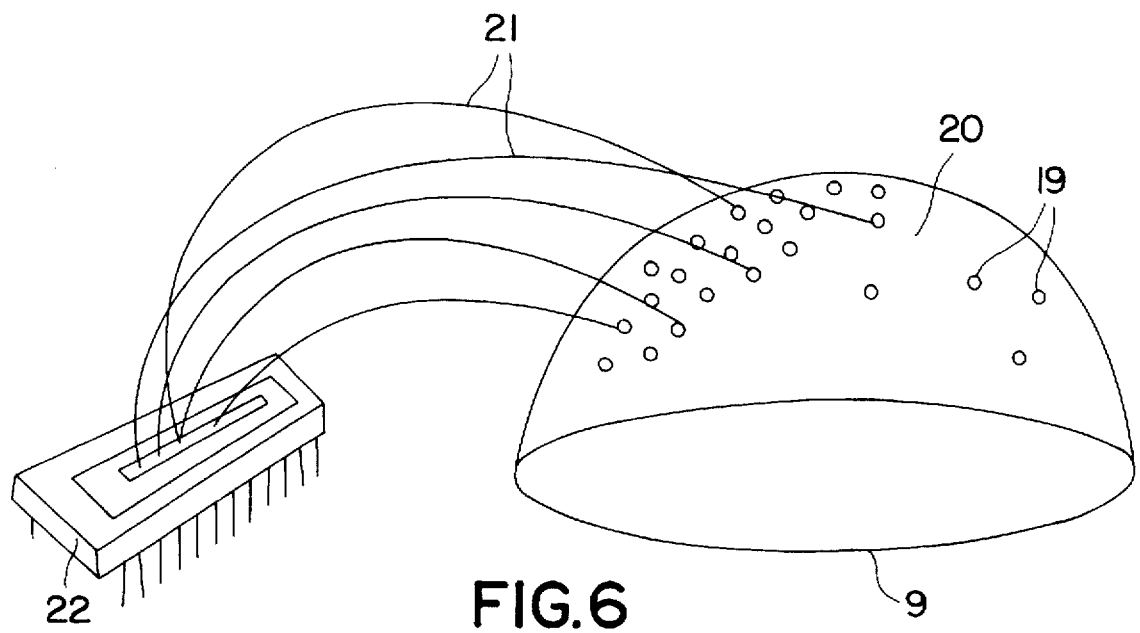
Figure 7:
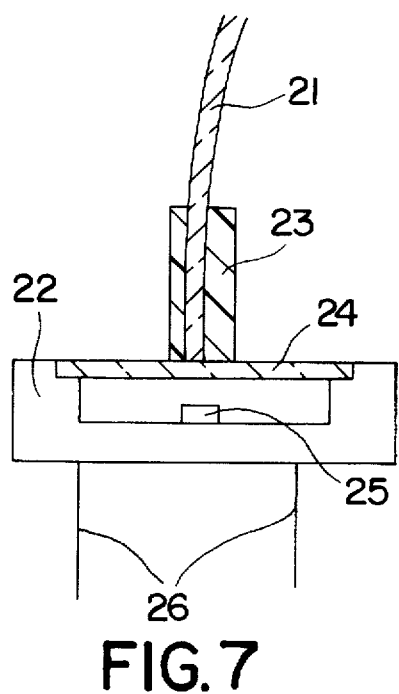
Figures 8, 9:
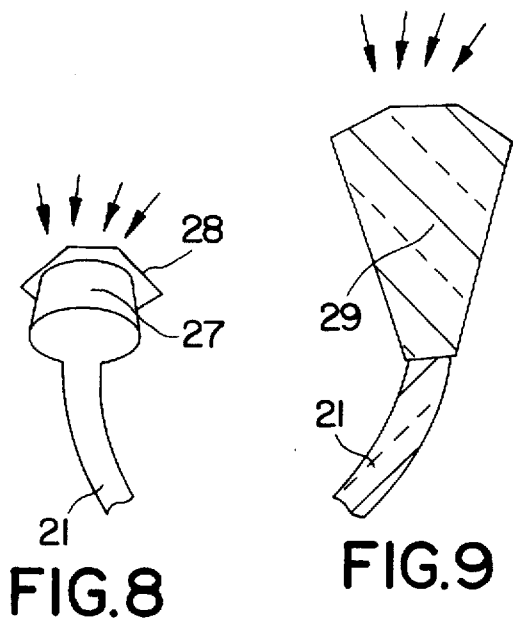

United States Patent [19]

Brück

[11] Patent Number: 5,764,364
[45] Date of Patent: Jun. 9, 1998

[54] SCATTERED-LIGHT LASER MICROSCOPE

[75] Inventor: Gernot K. Brück, Hoensbroek, Netherlands

[73] Assignee: IMAB Stiftung, Liechtenstein, Germany

[21] Appl. No.: 535,207

[22] PCT Filed: Apr. 19, 1994

[86] PCT No.: PCT/DE94/00419

§ 371 Date: Mar. 21, 1996

§ 102(e) Date: Mar. 21, 1996

[87] PCT Pub. No.: WO94/24600

PCT Pub. Date: Oct. 27, 1994

[30] Foreign Application Priority Data

Apr. 22, 1993 [DE] Germany ............... 43 13 094.1

[51] Int. Cl.[6] ............................................. G02B 21/00
[52] U.S. Cl. ................................... 356/371; 356/446
[58] Field of Search ............................. 356/371, 446, 356/343; 250/559.16

[56] References Cited

U.S. PATENT DOCUMENTS 3,476,482  11/1969  Howard .
4,412,746  11/1983  Yokouchi ............................. 356/446
4,583,858  4/1986   Lebling et al. ...................... 356/446
4,583,861  4/1986   Yamaji et al. ...................... 356/446
4,954,722  9/1990   Fine et al. .......................... 356/446
4,973,164  11/1990  Weber et al. ....................... 356/371
4,991,971  2/1991   Geary et al. ........................ 356/446

*Primary Examiner*—Richard A. Rosenberger
*Attorney, Agent, or Firm*—Diller, Ramik & Wight, PC

[57] ABSTRACT

The invention relates to a method for laser-microscopic magnification of objects, and to a device for implementing the method. In particular, organic, elastic or insulating objects, as well as their surface structures, can be examined down to the nanometer range by this method in a contactless manner and without preparation, and the optical signals generated can be processed with little technical effort. To this end, the specimens are irradiated with a laser beam which has previously been expanded to a larger beam diameter via an expanding lens system (3) and subsequently focused to the smallest possible beam diameter by means of a focusing lens (5) of short focal length. The object can be screened in this context. The intensity of the reflected light and scattered light (6) is detected at a very large solid angle, preferably on the inner surface of one of two hemispherical bowls with direct or indirect photosensors. Optical fibers can be used as photosensors.

16 Claims, 2 Drawing Sheets

SCATTERED-LIGHT LASER MICROSCOPE

PRIOR ART

Different devices are used for magnifying and examining objects and the surfaces of objects in the subminiature size range. For example, light microscopes, electron microscopes and scanning electron microscopes, etc. are employed for this purpose.

These instruments are sufficiently familiar and need not be individually listed here.

However, conventional light microscopes without additional electronic equipment are out of the question when it comes to analysing the recorded image and developing statements concerning it.

The electronic equipment required for this purpose, usually a CCD camera, is relatively complex and the analysis logic, i.e. the necessary computer and the program, are seldom set up in such a way that reproducible results can be obtained.

Devices with an analytical function, where the image itself is mostly generated electronically, are always highly complex, very sophisticated and, above all, very expensive.

PROBLEM

The problems arising during magnification and analysis are numerous and depend on the method used.

In the case of light microscopy, the most commonly used method, the recorded image can, as described above, only be analysed with the aid of an add-on CCD camera and subsequent image processing.

Another problem is the very small solid angle at which detection takes place with this system and others. The same applies to all other systems equipped with lenses or lens-like objectives.

In other magnification methods, the objects have to be specially prepared, e.g. by vacuum evaporation of a metal film. This not only involves a major effort, but also excludes various objects from preparation. Moreover, the area which can be used for detection is again considerably restricted.

Other scanning imaging methods are also only possible if the specimens are prepared or consist of a suitable material.

Up to now, it has only been possible to examine organic, elastic or insulating objects by means of light microscopy.

PROBLEM SOLUTION

The aim now is to develop a method with which all kinds of objects can be magnified in a contactless manner and without preparation and which provides a wealth of information for analysis.

It should also be possible, with certain restrictions, to magnify objects located close below a water surface and to perform a corresponding analysis.

LASER MICROSCOPY

The method of laser microscopy according to the invention, using one or also two hemispherical bowls to provide surfaces for analysis, offers an ideal solution to the problem.

A laser beam is set to the necessary beam width by means of an expanding lens system and then brought into focus with the minimum possible diameter using a lens of short focal length.

As the diameter is limited by the wavelength of the laser light, on the one hand, and also determined by the parameters of beam diameter upstream of the lens and focal length of the lens, on the other hand, beam diameters of approx. 1000 nm, equivalent to 1 µm, at the focus can be achieved with lasers emitting light in the visible range.

However, this alone is not sufficient for achieving magnification with adequate resolution, particularly when evaluating and analysing organic objects, e.g. when analysing erythrocytes. In such cases, the analysis of additional information is indispensable.

In order to do this, it is necessary to detect all the light phenomena occurring upon irradiation of the object with the highly focused laser beam at the largest possible solid angle and to penetrate deep into the surface structure of the particle to be examined.

Thus, the focused beam is moved over the specimen slide by means of mechanical devices or optoelectrical systems, the object being identified and preliminarily analysed in this way. The step size should not exceed the beam diameter in this context.

A hemisphere is positioned around the focal point above the specimen slide and, in the case of transparent specimen slides, also below the specimen slide, the central point(s) of this/these hemisphere(s) being located in the focal point of the laser beam.

Direct or indirect photosensors are fitted in a regular pattern inside the hemispheres.

As extensive electronic equipment and, above all, a considerable amount of time are required in order to read out individual photosensors, such as photoelectric cells, it is logical to use indirect photosensors. These consist of fine optical fibres which lead from individual measuring points on the surface of the hemisphere and are bundled to one or, if necessary, several rows.

These rows then end on the linear CCD. In this way, the brightnesses at the various points on the inner surface of the hemisphere are imaged on one or more CCD rows, with each pixel or pixel group of the CCD standing for a specific position on the hemisphere.

Should sharply defined and almost punctiform intensities arise on the surface of the hemisphere which are located between the individual recording points and are thus not covered by the defined grid on the surface of the hemisphere, the fields resulting around the recording points must be equipped with special collector surfaces.

These can consist of small sector surfaces made of a suitable scattering material, in which case the incident intensity on these small sector surfaces leads to brightening of the entire surface element and this total brightness is measured by means of the photosensors or optical fibres.

Another possibility is to use transparent materials, in which case the surface element is reduced to the cross-sectional area of the optical fibre over a certain distance. The incident light is then guided into the optical fibre as a result of multiple reflection.

The hemispherical detector surfaces around the focal point, created using the device according to the invention, now allow comprehensive analysis of the reflected light and, above all, the scattered light.

This makes it possible not only to accurately measure and analyse all objects down to the size of the minimum diameter of the beam, but also to analyse the surface structure by means of scattered-light analysis.

This is especially true if a laser with linear polarisation is used, thus producing particularly characteristic distributions of the scattered light. Their analysis even permits statements to be made concerning extremely small structures.

As a result, structural analyses can be performed down to a size of a few nm.

The use of piezoelectric cells in the reflecting mirrors and the lens mount not only permits very small structures to be scanned and recorded, but also allows very rapid adjustment by raising or lowering the focal point.

As the measurement takes place at the maximum possible solid angle, it is possible both to scan, measure and calculate the form of relatively large bodies, and also to detect their surface structure from the scattered light.

Owing to the contactless measurement of objects which have not been specially prepared, this method is particularly suitable for use in the field of serological diagnostics.

In this case, it is the task of the method according to the invention to measure the surface of erythrocytes by means of the device according to the invention and to quantify the antibodies on their surfaces.

As all the elements used are relatively inexpensive mass-produced items, the price of the overall system also remains within reasonable limits and is well below that of comparable measuring systems.

DESCRIPTION

An example of the method according to the invention is described on the basis of FIGS. 1 and 2. An example of the device according to the invention is described in the basis of FIGS. 3 to 9.

Thus, the following details are illustrated in FIGS. 1 and 2:

The laser beam from laser 1 passes via reflecting mirror 2 into expanding lens system 3. The beam is expanded at this point. This expanded beam 4 strikes focusing lens 5 and is concentrated onto focal point 7. Specimen slide 8 is scanned in the two possible directions of the plane using the beam focused to the smallest possible diameter.

This produces reflected and scattered light 6, which then strikes hemispherical surface 9, where it is detected.

The following details are illustrated in FIGS. 3 to 9:

Detector hemispheres 9 are fitted with light-detecting points 19, either at equal distances from each other or at distances subdivided into sectors. Either optical fibres 21 lead directly to these points from the outer surface of hemisphere 20 to the inside of the hemisphere, or this is done via light collectors as per FIG. 8 or FIG. 9.

These light collectors consist either a diffusing screen 27, which is fitted into a frame 28, or a sector element 29 made of transparent material and narrowing to the diameter of the optical fibre. The resultant overall brightness of the diffusing screen is measured in the former case, with the light reaching optical fibre 21 via multiple reflection in the latter case.

Optical fibres 21 end on linear CCD 22 and sit on glass 24 of the CCD. Mount 23 ensures that optical fibres 21 are held in position directly above pixel row 25.

The information is passed to the computer (not shown) via connecting pins 26.

In order to guide beam 4 more rapidly and under computer control, the beam is guided via horizontal mirror 17 and vertical mirror 18. These mirrors then each consist of mirror holder 15, on which mirror element 10 rests with its reflective layer 11 in such a way that one edge of the mirror element is embedded in elastic plastic 12, with the opposite side resting on piezoelectric cell 13 via adhesive layer 14. Changing the voltage applied to the piezoelectric cell causes a change in the shape of the cell, this resulting in a change in the position of the mirror in that the mirror rotates about the edge embedded in the plastic.

Fine focusing can be achieved in a similar manner, in that focusing lens 5 is mounted in plastic ring 19 which rests on piezoelectric cells 13. The piezoelectric cells rest on lens holder 16.

A change in the voltage of all piezoelectric cells bearing the lens also results in a change in the position of the lens, this allowing the focal point to be raised or lowered.

I claim:

1. A laser microscope comprising a specimen slide, means for moving the specimen slide in two directions of a plane, means for irradiating a specimen carried by the specimen slide with a laser beam focused to the smallest possible diameter and moving the focused beam over the specimen slide, means for detecting the light reflected and scattered by the specimen within at least a hemispherical surface the center of which is located at the focal point of the laser beam, the hemispherical surface being subdivided into sectors that are provided with individual sensing means for sensing incident light, and light collector means for gathering the light scattered in the sections between the individual sensing means.

2. The laser microscope as defined in claim 1 wherein said light collector means are a plurality of transparent surface portions of said hemispherical surface.

3. The laser microscope as defined in claim 1 wherein said light collector means are a plurality of light scattering enhancement surface portions of said hemispherical surface which increase the overall brightness of each individual sensing means.

4. A laser microscope comprising means for generating a laser beam, means for expanding the laser beam to a large beam diameter, short focal length lens means for focusing the large beam diameter laser beam to the smallest possible beam diameter, means for effecting relative movement between a specimen and the laser beam, irradiating the specimen by the laser beam thereby creating varied intensities of scattered light, means for detecting the scattered light by a plurality of photosensor means distributed about at least one hemispherical detector surface having a central point located in the focal point of the laser beam, means for analyzing output signals from the photosensor means, a plurality of fields between the plurality of photosensor means, and means at the plurality of fields for collecting scattered light impinging thereon thereby effecting total light detection by said photosensor means.

5. The microscope as defined in claim 4 including another hemispherical detector surface having a central point located in the focal point of the laser beam, additional means for detecting the scattered light by an additional plurality of photosensor means distributed about said another hemispherical detector surface, a plurality of additional fields between the additional plurality of photosensor means, and further means at said plurality of additional fields for collecting scattered light impinging thereon thereby effecting total light detection by said additional plurality of photosensor means.

6. The laser microscope as defined in claim 5 including a reflecting mirror means for guiding the laser beam, piezoelectric means for supporting said mirror means, and means for applying selected voltages to said piezoelectric means to thereby vary the position of said mirror means and effect laser beam guidance.

7. The laser microscope as defined in claim 5 including a reflecting mirror means for guiding the laser beam, piezoelectric means for supporting said mirror means, means for applying selected voltages to said piezoelectric means to thereby vary the position of said mirror means and effect laser beam guidance, and elastic plastic means for mounting said mirror means and said piezoelectric means.

8. The laser microscope as defined in claim 5 wherein said specimen moving means includes motors for moving a specimen slide in two directions of a common plane.

9. The laser microscope as defined in claim 4 including optical fiber means for conducting light from said photosensor means to said analyzing means, and said photosensor means include a linear CCD defining pixels representing a specific detecting means position of said hemispherical detector surface.

10. The laser microscope as defined in claim 9 including a reflecting mirror means for guiding the laser beam, piezoelectric means for supporting said mirror means, means for applying selected voltages to said piezoelectric means to thereby vary the position of said mirror means and effect laser beam guidance, and elastic plastic means for mounting said mirror means and said piezoelectric means.

11. The laser microscope as defined in claim 9 wherein said specimen moving means includes motors for moving a specimen in two directions of a common plane.

12. The laser microscope as defined in claim 4 including a reflecting mirror means for guiding the laser beam, piezoelectric means for supporting said mirror means, and means for applying selected voltages to said piezoelectric means to thereby vary the position of said mirror means and effect laser beam guidance.

13. The laser microscope as defined in claim 12 including a reflecting mirror means for guiding the laser beam, piezoelectric means for supporting said mirror means, and means for applying selected voltages to said piezoelectric means to thereby vary the position of said mirror means and effect laser beam guidance.

14. The laser microscope as defined in claim 4 including a reflecting mirror means for guiding the laser beam, piezoelectric means for supporting said mirror means, means for applying selected voltages to said piezoelectric means to thereby vary the position of said mirror means and effect laser beam guidance, and elastic plastic means for mounting said mirror means and said piezoelectric means.

15. The laser microscope as defined in claim 4 wherein said specimen moving means includes motors for moving a specimen slide in two directions of a common plane.

16. The laser microscope as defined in claim 4 including means for selectively moving said lens means.

* * * * *